United States Patent
Poertzgen et al.

(10) Patent No.: US 10,190,648 B2
(45) Date of Patent: Jan. 29, 2019

(54) ACTUATING DEVICE FOR AN ELECTROMECHANICALLY ACTUATABLE VEHICLE BRAKE

(71) Applicant: Lucas Automotive GmbH, Koblenz (DE)

(72) Inventors: Gregor Poertzgen, Koblenz (DE); Christian Dilla, Bendorf (DE)

(73) Assignee: Lucas Automotive GmbH, Koblenz (DE)

( * ) Notice: Subject to any disclaimer, the term of this patent is extended or adjusted under 35 U.S.C. 154(b) by 23 days.

(21) Appl. No.: 15/306,779

(22) PCT Filed: Dec. 5, 2014

(86) PCT No.: PCT/EP2014/076719
§ 371 (c)(1),
(2) Date: Oct. 26, 2016

(87) PCT Pub. No.: WO2015/165555
PCT Pub. Date: Nov. 5, 2015

(65) Prior Publication Data
US 2017/0051801 A1    Feb. 23, 2017

(30) Foreign Application Priority Data
Apr. 29, 2014   (DE) .................. 10 2014 006 105

(51) Int. Cl.
*B60T 13/74*  (2006.01)
*F16D 65/18*  (2006.01)
(Continued)

(52) U.S. Cl.
CPC ............ *F16D 65/18* (2013.01); *B60T 13/741* (2013.01); *F16D 55/226* (2013.01);
(Continued)

(58) Field of Classification Search
CPC .... F16D 65/18; F16D 55/226; F16D 2121/24; F16D 2125/40; F16D 2125/48; B60T 13/741
(Continued)

(56) References Cited

U.S. PATENT DOCUMENTS 6,536,561 B1   3/2003 Keller
6,761,252 B1   7/2004 Weiler et al.
(Continued)

FOREIGN PATENT DOCUMENTS

DE        19851670 A1   5/2000
DE        19906227 A1   8/2000
(Continued)

OTHER PUBLICATIONS

PCT International Search Report and Written Opinion, Application No. PCT/EP2014/076719 filed Dec. 5, 2014, dated Sep. 16, 2015.
(Continued)

*Primary Examiner* — Pamela Rodriguez
(74) *Attorney, Agent, or Firm* — MacMillan, Sobanski & Todd, LLC

(57) ABSTRACT

An actuating device is specified for an electromechanically actuatable vehicle brake. The device comprises a multi-stage transmission unit, which is arranged between a driving electric motor and a driven drive element of the vehicle brake, wherein at least one stage of the transmission unit is embodied as a spur-gear transmission, and at least two stages of the transmission unit are coupled by means of a double gearwheel, the rotational axis of which extends parallel to the rotational axis of the electric motor. The transmission unit has at least one intermediate stage which is embodied as a spur-gear transmission and into which at least one stage, embodied as a spur-gear transmission, of the transmission unit is integrated.

19 Claims, 8 Drawing Sheets

(51) Int. Cl.
*F16D 121/24* (2012.01)
*F16D 125/40* (2012.01)
*F16D 125/48* (2012.01)
*F16D 55/226* (2006.01)

(52) U.S. Cl.
CPC ...... *F16D 2121/24* (2013.01); *F16D 2125/40* (2013.01); *F16D 2125/48* (2013.01)

(58) Field of Classification Search
USPC ..... 188/162, 158, 156, 159, 73.1, 72.1, 72.6
See application file for complete search history.

(56) References Cited

U.S. PATENT DOCUMENTS

| | | | |
|---|---|---|---|
| 7,325,658 B2* | 2/2008 | Halasy-Wimmer | ........................... B60T 13/741 188/158 |
| 8,186,488 B2* | 5/2012 | Poertzgen | ............. B60T 13/746 188/162 |
| 8,790,208 B2 | 7/2014 | Poertzgen et al. | |
| 2004/0195058 A1 | 10/2004 | Ina et al. | |
| 2014/0090933 A1 | 4/2014 | Sakashita et al. | |

FOREIGN PATENT DOCUMENTS

| | | |
|---|---|---|
| DE | 102004016144 A1 | 11/2004 |
| DE | 102004048700 A1 | 5/2006 |
| DE | 102005036863 A1 | 2/2007 |
| DE | 102009060203 A1 | 6/2011 |
| FR | 1124985 A | 10/1956 |
| JP | 2011179569 A | 9/2011 |
| WO | 2000061962 A1 | 10/2000 |
| WO | 2011076366 A1 | 6/2011 |
| WO | 2012010256 A1 | 1/2012 |

OTHER PUBLICATIONS

PCT International Preliminary Report on Patentability, Application No. PCT/EP2014/076719 filed Dec. 5, 2014, dated Apr. 19, 2016.

* cited by examiner

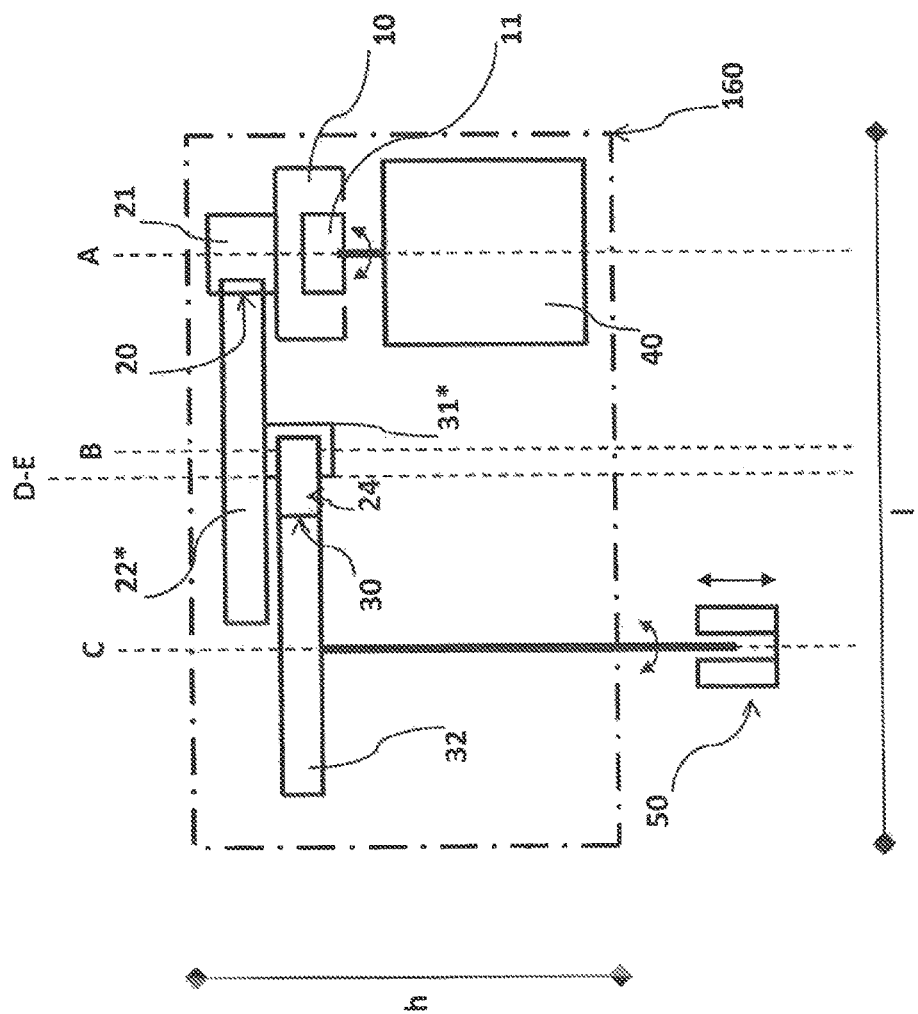

ACTUATING DEVICE FOR AN ELECTROMECHANICALLY ACTUATABLE VEHICLE BRAKE

CROSS-REFERENCE TO RELATED APPLICATIONS

This application is a national stage of International Application No. PCT/EP2014/076719 filed 5 Dec. 2014, the disclosures of which are incorporated herein by reference in entirety, and which claimed priority to German Patent Application No. 10 2014 006 105.1 filed 29 Apr. 2014, the disclosures of which are incorporated herein by reference in entirety.

BACKGROUND OF THE INVENTION

The invention relates to an actuating device for an electromechanically actuatable vehicle brake. Such an actuating device can be provided for actuating an electric parking brake (EPB) or an electromechanical service brake (EMB) of a motor vehicle.

US 2014/0090933 A1 discloses a disk brake arrangement having a speed reduction mechanism which comprises a plurality of spur-gear transmission stages.

In addition, WO 2012/010256 A1 and DE 10 2004 048 700 A1 discloses, inter alia, an actuating device which has a multi-stage transmission unit which is arranged between a driving electric motor and a driven drive element of the vehicle brake. In this known actuating device, the first and second stages of the transmission unit are each embodied as a spur-gear transmission and are coupled by means of a double gearwheel whose rotational axis extends parallel to the rotational axis of the electric motor. The design of such a known actuating device is explained in more detail using FIG. 1. Such a known actuating device has a compact design which results from the use of double gearwheels, so that comparatively small installation space is required.

However, owing to the compact design, the braking or tensioning forces which can be generated for the vehicle brake by means of such a known actuating device are limited upwardly. Since it is only possible to generate braking forces up to an order of magnitude of 20 kilonewtons, such a known actuating device is suitable only for use in vehicles with a weight up to an order of magnitude of 2 tonnes.

BRIEF SUMMARY OF THE INVENTION

The invention is therefore based on the feature of developing such a known actuating device to the effect that, on the one hand, a compact design is retained and, In this respect, the invention proposes that the multi-stage transmission unit of the actuating device additionally has at least one intermediate stage which is embodied as a spur-gear transmission and into which at least one stage, embodied as a spur-gear transmission, of the transmission unit is integrated.

By means of the at least one intermediate stage it becomes possible to increase the transmission ratio or reduction ratio of the stages which are present in the multi-stage transmission unit in such a way that given virtually identical power of the driving electric motor a higher torque is generated on the output side by the transmission unit in order to actuate the vehicle brake. As a result, requirements for braking forces above an order of magnitude of 20 kilonewtons can be met. This is because the reaction forces which are increased owing to the increased transmission ratio or reduction ratio are taken up and conducted away via the at least one intermediate stage. A compact design is retained since (firstly) the power and therefore at the same time the structural volume of the electric motor is not increased, (secondly) the at least one intermediate stage is embodied as a space-saving spur-gear transmission, and (thirdly) the at least one intermediate stage is integrated into the at least one stage of the transmission unit which is embodied as a spur-gear transmission. Since the structural volume of the actuating device according to the invention is not significantly increased, the advantage is obtained that it is not necessary to adapt the actuating device according to the invention to restrictions in the predefined installation space which can arise owing, for example, to chassis components which are present in the vicinity of the vehicle brake.

Since the power of the driving electric motor does not necessarily have to be increased, a further advantage can be that the electrical components for driving the electric motor can also be retained, so that no additional expenditure is incurred, for example, on larger line cross sections, more powerful output stages and the like.

In order to meet requirements for braking forces of an order of magnitude of 25 kilonewtons, it is sufficient to integrate just one intermediate stage into one of the stages of the transmission unit which are embodied as a spur-gear transmission. Even if just one intermediate stage is integrated, the transmission ratio or reduction ratio of the stages which are present in the transmission unit can be doubled. For example, for the transmission unit it is possible to increase an overall reduction ratio of an order of magnitude of 150:1 to an overall reduction ratio of an order of magnitude of 300:1. If even higher requirements are to be met, an intermediate stage can be integrated into a plurality of stages of the transmission unit.

According to one preferred embodiment, the at least one intermediate stage which is embodied as a spur-gear transmission has two intermediate gearwheels. Ideally, the two intermediate gearwheels are dimensioned identically, in particular with respect to the number of their teeth or their diameter. Furthermore, the rotational axes of the two intermediate gearwheels each extend parallel to the rotational axis of the electric motor. This results in a symmetrical arrangement in which the plane formed by the rotational axes of the intermediate gearwheels extends perpendicularly with respect to the plane formed by the rotational axis of the electric motor and the rotational axis of the first double gearwheel. Owing to the symmetrical arrangement, the large advantage is obtained that reaction forces which are active owing to the high braking forces or tensioning forces during the operation of the actuating device are conducted away in an equally distributed fashion via the two intermediate gearwheels. For the equally distributed or symmetrical conduction away of the reaction forces via the two intermediate gearwheels it is also viable that the actuating device or the drive motor thereof is operated in two rotational directions in order to adjust the braking forces or tensioning forces generated for the vehicle brake, by fitting and removing the brake linings.

For a first variant of an actuating device according to the invention it is proposed that the first and second stages of the transmission unit are each embodied as a spur-gear transmission, wherein the transmission unit has at least one intermediate stage which is embodied as a spur-gear transmission and is integrated into the first and/or the second stage of the transmission unit. The first and second stages of the transmission unit can be coupled by means of a double gearwheel whose rotational axis extends parallel to the rotational axis of the electric motor.

In this context it can also be provided that the second stage is coupled to a third stage by means of a further double gearwheel whose rotational axis extends parallel to the rotational axis of the electric motor. The third stage is advantageously embodied as a space-saving planetary transmission whose structural volume extends coaxially with respect to the rotational axis of the further double gearwheel. According to the symmetrical arrangement, the rotational axis of the further double gearwheel lies in the plane formed by the rotational axis of the electric motor and the rotational axis of the first double gearwheel. Depending on the desired increase in the transmission ratio or reduction ratio of the transmission unit the planetary transmission can itself also be embodied with multiple stages.

It is characteristic of the compact design of the first variant of an actuating device according to the invention that the sectional line at which the plane formed by the rotational axes of the intermediate gearwheels intersects the plane formed by the rotational axes of the electric motor and of the double gearwheels runs between the rotational axis of the electric motor and the rotational axis of the further double gearwheel.

For a second variant of an actuating device according to the invention it is proposed that the first and third stages of the transmission unit are each embodied as spur-gear transmissions, wherein the at least one intermediate stage is integrated into the first and/or third stage of the transmission unit. It can be provided here that the first stage is coupled to a second stage by means of a double gearwheel, and the second stage is embodied as a single-stage or multi-stage planetary transmission.

For a third variant of an actuating device according to the invention it is proposed that the second and third stages of the transmission unit are each embodied as spur-gear transmissions, wherein the at least one intermediate stage is integrated into the second and/or third stage of the transmission unit. It can be provided here that the second stage is coupled to the third stage by means of a double gearwheel, and the first stage is embodied as a single-stage or multi-stage planetary transmission.

According to the symmetrical arrangement, in the second and third variants the rotational axis of a gearwheel which has the largest diameter in the third stage can lie in the plane formed by the rotational axis of the electric motor and the rotational axis of the double gearwheel.

For a compact design of the second and third variants it can be provided that the sectional line at which the plane formed by the rotational axes of the intermediate gearwheels intersects the plane formed by the rotational axes of the electric motor, of the double gearwheel and of the gearwheel with the largest diameter in the third stage runs between the rotational axis of the electric motor and the rotational axis of the gearwheel with the largest diameter in the third stage.

Even if a virtually optimum compromise in terms of installation space requirement, torque which can be generated and efficiency can be achieved for the actuating device according to the invention by means of a transmission unit with three stages which are connected one behind the other and whose rotational axes form a plane, the invention is not restricted to such a compromise but rather can (theoretically) comprise any desired number of transmission stages. In this respect, the stage of the transmission unit which is referred to as the "first stage" is to be understood as that transmission stage which is driven on the input side by the electric motor. And in this respect the stage of the transmission unit which is referred to as the "third stage" is to be understood as that transmission stage by which the drive element of the vehicle brake is driven on the output side. In this context, the stage of the transmission unit which is referred to as "second stage" is to be understood as being that stage of the transmission unit which is connected downstream of the first stage and/or upstream of the third stage.

As already mentioned, as a rule it is sufficient to integrate just one intermediate stage into one of the stages of the transmission unit which are embodied as a spur-gear transmission. As a result, it is possible to embody at least one stage of the transmission unit into which no intermediate stage is integrated as a belt drive or toothed belt drive or friction gear. As a result, gearwheels are not in meshing engagement with one another, so noise occurring during operation is isolated.

On the basis of the variants discussed above it is possible, in particular, to provide an actuating device for an electronically actuatable vehicle brake comprising a multi-stage transmission unit which is arranged between a driving electric motor and a driven drive element of the vehicle brake, wherein the first and second stages of the transmission unit are each embodied as a spur-gear transmission and are coupled by means of a double gearwheel whose rotational axis extends parallel to the rotational axis of the electric motor, wherein the transmission unit has at least one intermediate stage which is embodied as a spur-gear transmission and which is integrated into the first and/or second stage of the transmission unit.

The invention also relates to an electromechanically actuatable vehicle brake which comprises an actuating device according to the invention and a drive element which converts the rotational movement generated on the output side by the transmission unit of the actuating device according to the invention into a longitudinal movement in order to actuate the vehicle brake.

Other advantages of this invention will become apparent to those skilled in the art from the following detailed description of the preferred embodiments, when read in light of the accompanying drawings.

BRIEF DESCRIPTION OF THE DRAWINGS

FIG. 8 is a schematic side view of a seventh exemplary embodiment of an actuating device according to the invention, wherein functionally identical components are each denoted by the same reference symbols.

DETAILED DESCRIPTION OF THE INVENTION

Figure 1:
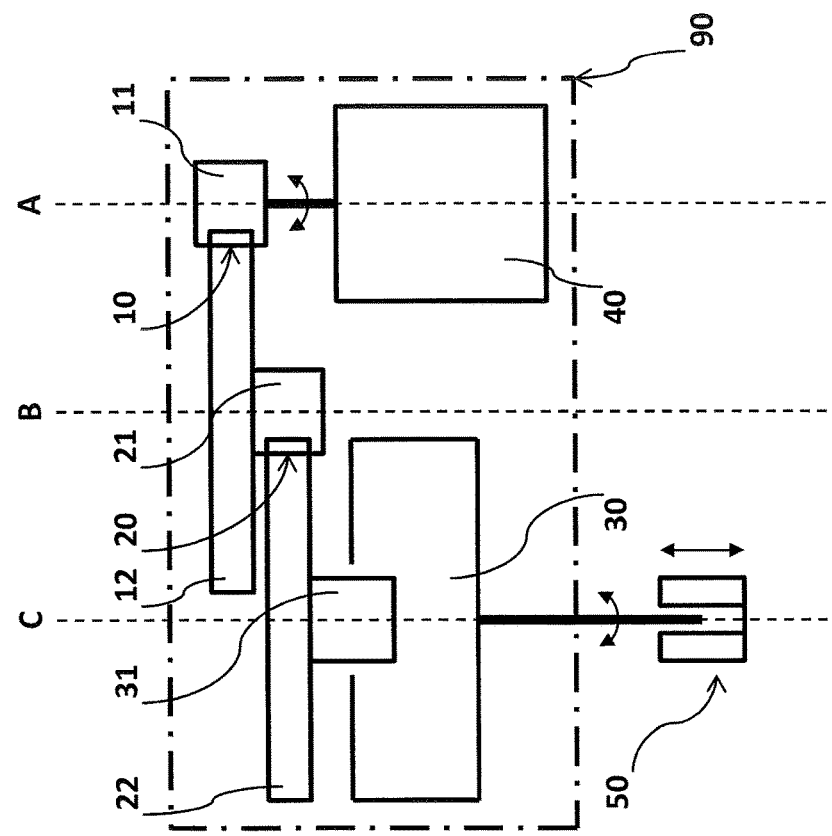
FIG. 1 is a schematic side view of an actuating device known from the prior art.

FIG. 1 is a schematic side view of an actuating device 90, known from the prior art, for an electromechanically actuatable vehicle brake. The actuating device 90 comprises a transmission unit with three stages 10, 20 and 30. On the input side, the transmission unit is driven by an electric motor 40. On the output side, a drive element 50 of the vehicle brake (not illustrated in more detail) is driven by the transmission unit. The drive element 50 of the vehicle brake is usually a nut/spindle transmission which converts the rotational movement generated on the output side by the transmission unit into a longitudinal movement for actuating the brake, that is to say generating and adjusting braking and tensioning forces in order to apply the brake linings to a friction face, such as, for example, a brake disk, and remove them therefrom.

The transmission unit transmits and determines the transmission ratio of the torque generated by the electric motor 40 and the rotational speed generated by the electric motor 40. For this purpose, the first stage 10 and the second stage 20 are each embodied as a spur-gear transmission; the third stage 30 is embodied as a planetary transmission (not illustrated in more detail).

The spur-gear transmission of the first stage 10 is formed by the gearwheels 11 and 12, wherein the smaller gearwheel 11 of the first stage 10 is the drive pinion of the electric motor 40, and it is therefore arranged coaxially with respect to the rotational axis or longitudinal axis A of the electric motor 40. The gearwheel 12 which has the largest diameter (generally referred to below as "larger gearwheel") of the first stage 10 is arranged coaxially with respect to a rotational axis B which extends parallel to the rotational axis A of the electric motor 40. In the first stage 10, the gearwheel 11 with the smallest diameter (referred to generally below as "smaller gearwheel") is directly in engagement with the larger gearwheel 12, as a result of which the smaller gearwheel 11 interacts directly with the larger gearwheel 12.

The spur-gear transmission of the second stage 20 is formed by the gearwheels 21 and 22, wherein the smaller gearwheel 21 of the second stage 20 is arranged coaxially with respect to the rotational axis B and is coupled in a rotationally fixed fashion to the larger gearwheel 12 of the first stage 10 so that the gearwheels 12 and 21 form a double gearwheel 12/21 which rotates about the rotational axis B. The larger gearwheel 22 of the second stage 20 is arranged coaxially with respect to a rotational axis C which extends parallel to the rotational axis A of the electric motor 40 and parallel to the rotational axis B of the double gearwheel 12/21.

In the second stage 20, the smaller gearwheel 21 is directly in engagement with the larger gearwheel 22, as a result of which the smaller gearwheel 21 interacts directly with the larger gearwheel 22.

The sun gear 31 of the planetary transmission 30 is arranged coaxially with respect to the rotational axis C and is coupled in a rotationally fixed fashion to the larger gearwheel 22 of the second stage 20, so that the gearwheels 22 and 31 form a double gearwheel 22/31 which rotates about the rotational axis C. The drive element 50 is usually also arranged coaxially with respect to the rotational axis C of the double gearwheel 22/31, wherein the rotational axis C corresponds to the longitudinal axis of the vehicle brake which as a rule extends coaxially with respect to the brake piston.

Figure 2:
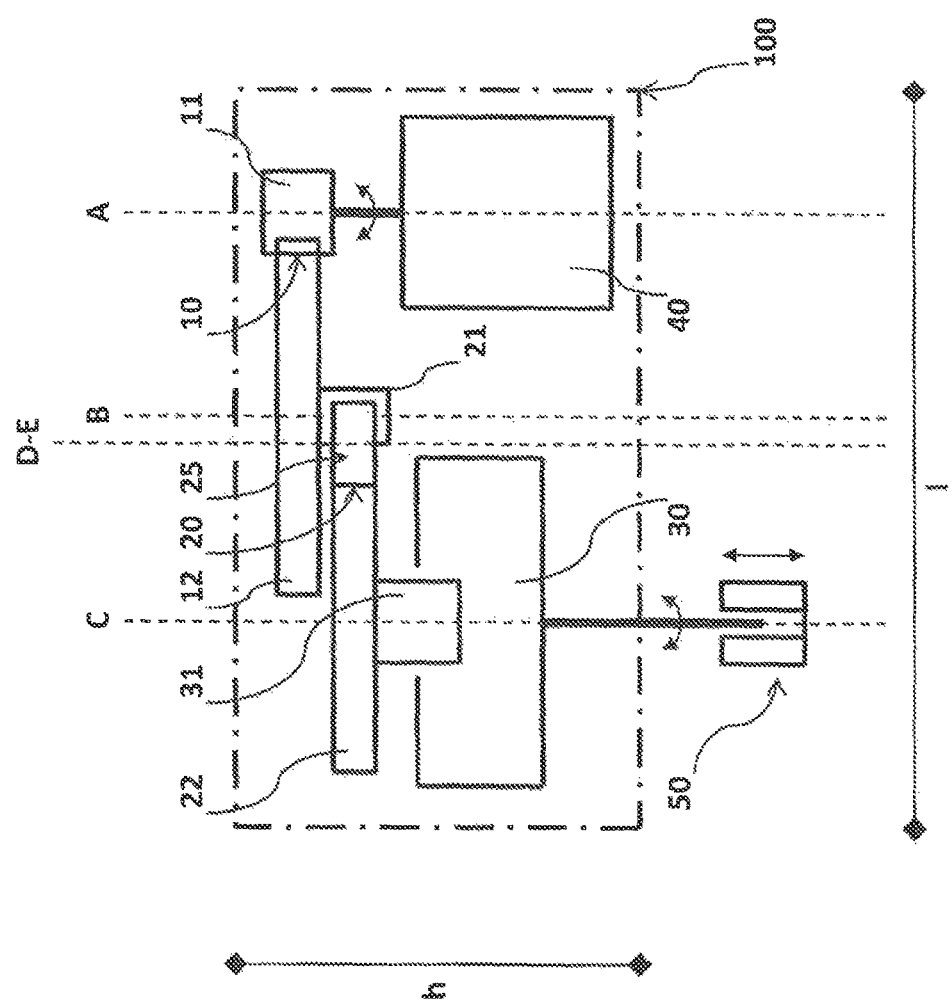
FIG. 2 is a schematic side view of a first exemplary embodiment of an actuating device according to the invention.

FIG. 2 is a schematic side view of a first exemplary embodiment of an actuating device 100 according to the invention for an electromechanically actuatable vehicle brake. In contrast with the known actuating device 90 which is shown in FIG. 1, the transmission unit of the actuating device 100 has an intermediate stage 25. The intermediate stage 25 is embodied as a spur-gear transmission and is integrated into the second stage 20 of the transmission unit. The design of the further stage 25 of the transmission unit is apparent from FIG. 3 which shows a schematic plan view of the actuating device 100 according to FIG. 2.

The spur-gear transmission of the further stage 25 is formed by a first intermediate gearwheel 25a, which is arranged coaxially with respect to a rotational axis D, and a second intermediate gearwheel 25b, which is arranged coaxially with respect to a rotational axis E. The rotational axes D and E of the intermediate gearwheels 25a and 25b extend parallel to the rotational axis A of the electric motor 40 and respectively parallel to the rotational axis B of the double gearwheel 12/21 or parallel to the rotational axis C of the larger gearwheel 22 of the second stage 20. The two intermediate gearwheels 25a and 25b interact with the smaller gearwheel 21 of the second stage 20 and the larger gearwheel 22 of the second stage 20.

The two intermediate gearwheels 25a and 25b are dimensioned identically in terms of the number of their teeth and their diameter. This results in a symmetrical arrangement in which the rotational axis A of the electric motor 40, the rotational axis B of the double gearwheel 12/21 and the rotational axis C of the larger gearwheel 22 form a common plane A-B-C which extends perpendicularly with respect to the plane D-E formed by the rotational axes D and E of the intermediate gearwheels 25a and 25b.

Furthermore, the two intermediate gearwheels 25a and 25b are dimensioned in terms of the number of their teeth or their diameter in such a way that each intermediate gearwheel is larger than the smaller gearwheel 21 of the second stage 20 and smaller than the larger gearwheel 22 of the second stage 20.

The distance between the rotational axes B and C can be varied by means of the diameter of the intermediate gearwheels 25a and 25b as well as the distance of their rotational axes D and E from the plane A-B-C formed by the rotational axes A, B and C, in order to adapt the actuating device 100 to a predefined installation space in the vehicle.

Figure 3:
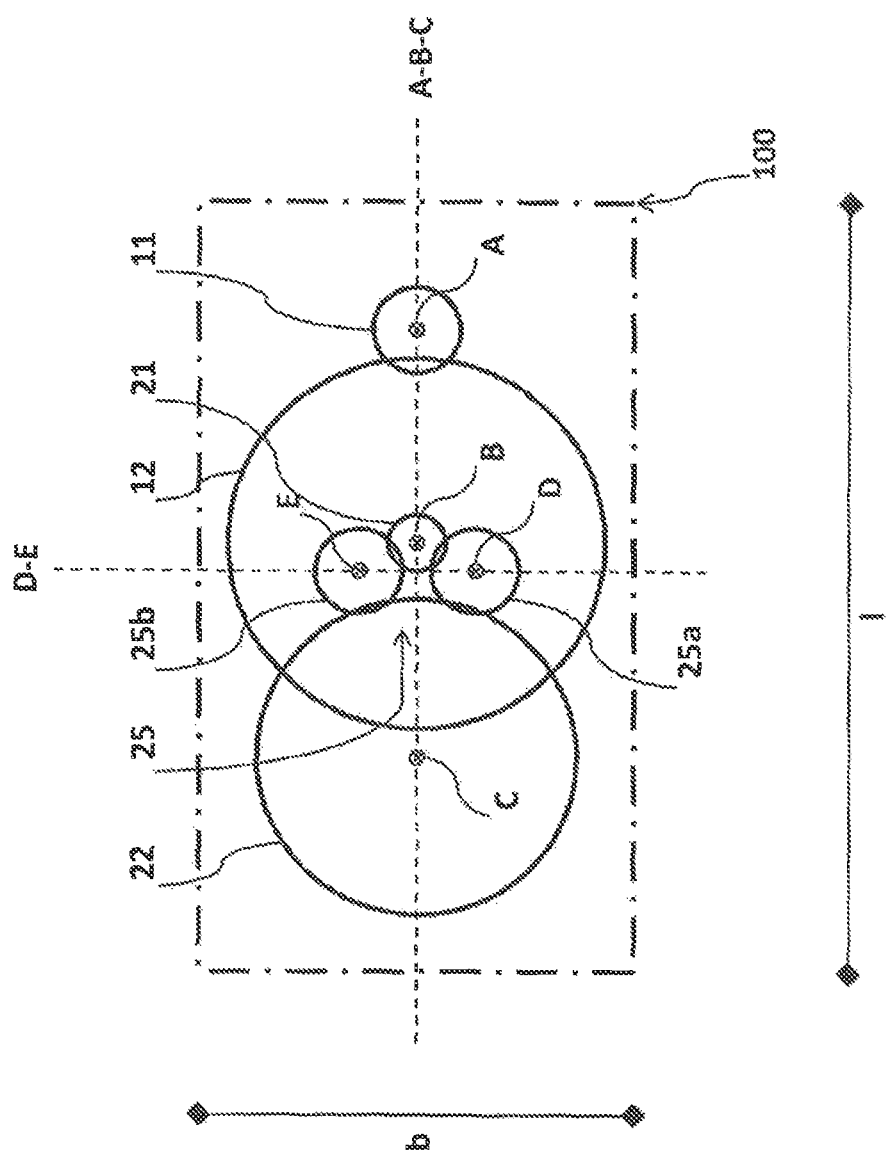
FIG. 3 is a schematic plan view of the actuating device according to FIG. 2.

As shown in FIG. 2 and FIG. 3, the required installation space and the structural volume of the actuating device 100 according to the invention are apparent from its installation length l, installation height h and installation width b.

The installation length l is determined essentially by the distance between the rotational axis C of the double gearwheel 22/31 and the rotational axis A of the electric motor 40. Since the sectional line at which the plane D-E formed by the rotational axes D and E of the intermediate gearwheels 25a and 25b intersects the plane A-B-C formed by the rotational axes A, B and C runs between the rotational axis A of the electric motor 40 and the rotational axis C of the double gearwheel 22/31—precisely between the rotational axis B of the double gearwheel 12/21 and the rotational axis C of the double gearwheel 22/31—and the diameter of the intermediate gearwheels 25a and 25b is correspondingly small, the actuating device 100 according to the invention does not require a significantly larger installation length l.

The installation height h is determined essentially by the dimensions of the first stage 10 and second stage 20, arranged one on top of the other in a planar form, of the transmission unit. Since the intermediate stage 25 formed by the intermediate gearwheels 25a and 25b is integrated into the second stage 20 and is arranged spatially in the plane thereof, the actuating device 100 according to the invention does not require a significantly larger installation height h.

The installation width b is essentially determined by the diameter of the larger gearwheel 12 of the first stage 10, and respectively the diameter of the larger gearwheel 22 of the second stage 20. Since the distance between the rotational axes D and E of the intermediate gearwheels 25a and 25b, respectively, and the plane A-B-C formed by the rotational axes A, B and C and the diameter of the intermediate gearwheels 25a and 25b are correspondingly small, so that the intermediate gearwheels 25a and 25b lie within the diameter of the larger gearwheel 12 or the diameter of the larger gearwheel 22, the actuating device 100 according to the invention does not require a significantly larger installation width b.

Figure 4:
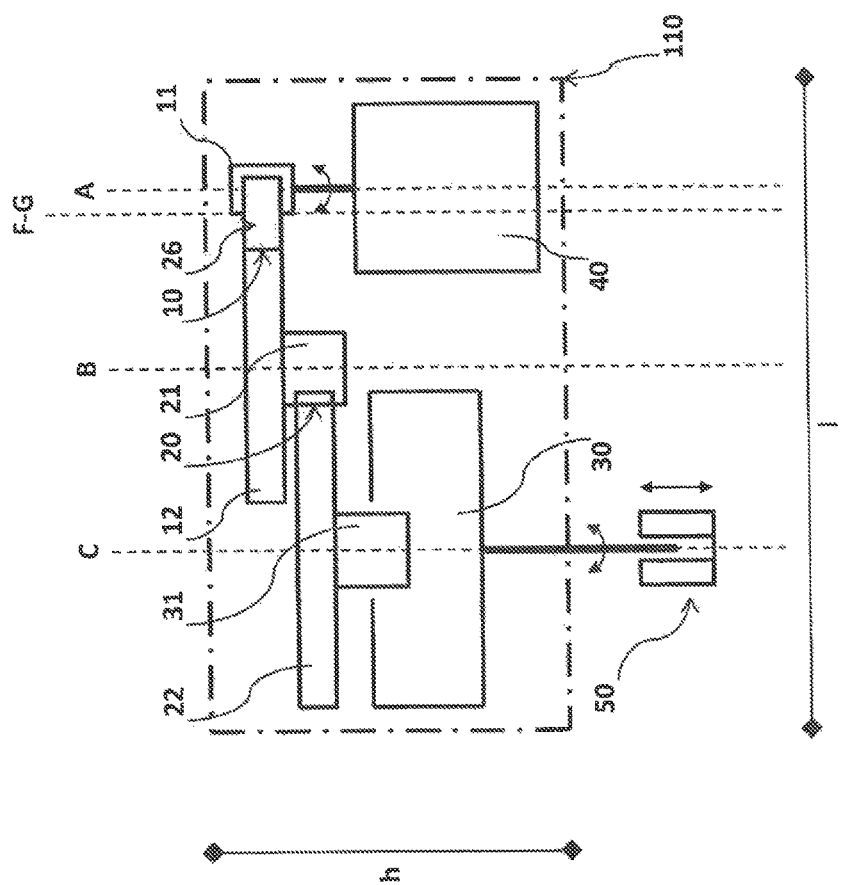
FIG. 4 is a schematic side view of a second exemplary embodiment of an actuating device according to the invention.

FIG. 4 shows a schematic side view of a second exemplary embodiment of an actuating device 110 according to the invention for an electromechanically actuatable vehicle brake. In contrast with the known actuating device 90 shown in FIG. 1, the transmission unit of the actuating device 110 has an intermediate stage 26. The intermediate stage 26 is embodied as a spur-gear transmission and is integrated into the first stage 10 of the transmission unit. The design of the further stage 26 of the transmission unit is apparent from FIG. 5, which shows a schematic plan view of the actuating device 110 according to FIG. 2.

The spur-gear transmission of the further stage 26 is formed by a first intermediate gearwheel 26a, which is arranged coaxially with respect to a rotational axis F, and a second intermediate gearwheel 26b, which is arranged coaxially with respect to a rotational axis G. The rotational axes F and G of the intermediate gearwheels 26a and 26b extend parallel to the rotational axis A of the electric motor 40 and respectively parallel to the rotational axis B of the double gearwheel 12/21 and respectively parallel to the rotational axis C of the larger gearwheel 22 of the second stage 20. The two intermediate gearwheels 26a and 26b interact with the smaller gearwheel 11 of the first stage 10 and the larger gearwheel 12 of the first stage 10.

The two intermediate gearwheels 26a and 26b are dimensioned identically in respect of the number of their teeth and their diameter. This results in a symmetrical arrangement in which the rotational axis A of the electric motor 40, the rotational axis B of the double gearwheel 12/21 and the rotational axis C of the larger gearwheel 22 form a common plane A-B-C which extends perpendicularly with respect to the plane F-G formed by the rotational axes F and G of the intermediate gearwheels 26a and 26b.

Furthermore, the two intermediate gearwheels 26a and 26b are dimensioned in terms of the number of their teeth and their diameter in such a way that each intermediate gearwheel is larger than the smaller gearwheel 11 of the first stage 10 and smaller than the larger gearwheel 12 of the first stage 10.

The distance between the rotational axes A and B can be varied by means of the diameter of the intermediate gearwheels 26a and 26b and the distance of their rotational axes F and G from the plane A-B-C formed by the rotational axes A, B and C, in order to adapt the actuating device 110 to a predefined installation space in the vehicle.

Figure 5:
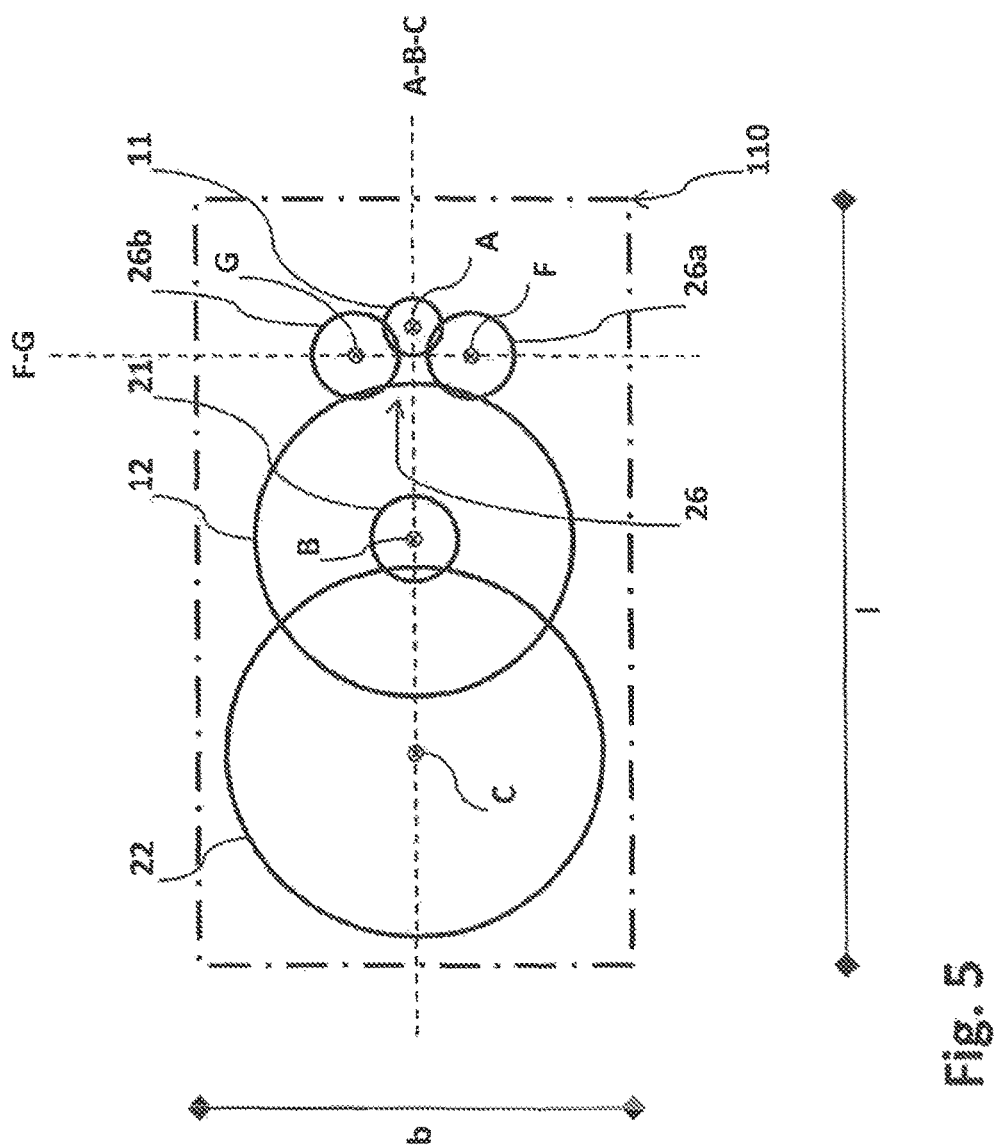
FIG. 5 is a schematic plan view of the actuating device according to FIG. 4.

As shown in FIG. 4 and FIG. 5, the required installation space and the structural volume of the actuating device 110 according to the invention are apparent from its installation length l, installation height h and installation width b.

The installation length l is determined essentially by the distance between the rotational axis C of the double gearwheel 22/31 and the rotational axis A of the electric motor 40. Since the sectional line at which the plane F-G formed by the rotational axes F and G of the intermediate gearwheels 26a and 26b intersects the plane A-B-C formed by the rotational axes A, B and C runs between the rotational axis A of the electric motor 40 and the rotational axis C of the double gearwheel 22/31—precisely between the rotational axis A of the electric motor 40 and the rotational axis B of the double gearwheel 12/21, and the diameter of the intermediate gearwheels 26a and 26b is correspondingly small, the actuating device 110 according to the invention does not require a significantly larger installation length l.

The installation height h is determined essentially by the dimensions of the first stage 10 and second stage 20, arranged one on top of the other in planes, of the transmission unit. Since the intermediate stage 25 formed by the intermediate gearwheels 26a and 26b is integrated into the first stage 10 and is spatially arranged in the plane thereof, the actuating device 110 according to the invention does not require a significantly larger installation height h.

The installation width b is determined essentially by the diameter of the larger gearwheel 12 of the first stage 10 and respectively the diameter of the larger gearwheel 22 of the second stage 20. Since the distance between the rotational axes F and G of the intermediate gearwheels 26a and 26b, respectively, and the plane A-B-C formed by the rotational axes A, B and C and the diameter of the intermediate gearwheels 26a and 26b are correspondingly small, so that the intermediate gearwheels 26a and 26b lie within the diameter of the larger gearwheel 12 and respectively the diameter of the larger gearwheel 22, the actuating device 110 according to the invention does not require a significantly larger installation width b.

There will be no more detailed explanation of a third exemplary embodiment of an actuating device according to the invention in which the third stage is embodied as a planetary transmission 30 and in which a further transmission stage is integrated both into the first stage 10 and into the second stage 20 of the transmission unit. This is because this is apparent to a person skilled in the art by combining the inventive actuating device 100 of the first exemplary embodiment according to FIG. 2 and FIG. 3 and the inventive actuating device 110 of the second exemplary embodiment according to FIG. 4 and FIG. 5.

Figure 6:
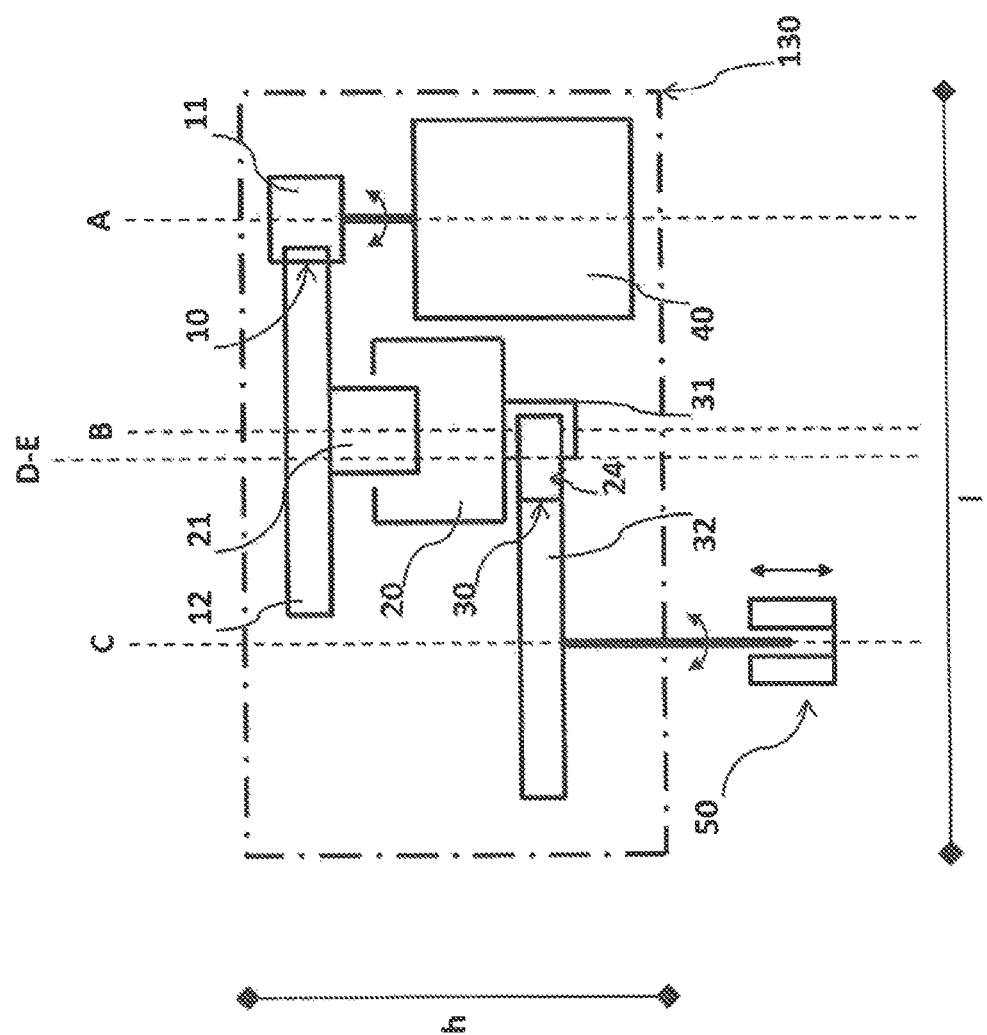
FIG. 6 is a schematic side view of a fourth exemplary embodiment of an actuating device according to the invention.

FIG. 6 is a schematic side view of a fourth exemplary embodiment of an actuating device 130 according to the invention for an electromechanically actuatable vehicle brake. In contrast with the inventive actuating devices 100 and 110 shown in FIG. 2 to FIG. 5, in the transmission unit of the actuating device 130 the first stage 10 and the third stage 30 are each embodied as a spur-gear transmission; the second stage 20 is embodied as a planetary transmission (not illustrated in more detail).

In this context, the spur-gear transmission of the first stage 10 is formed by the gearwheels 11 and 12, wherein the smaller gearwheel 11 of the first stage 10 is the drive pinion of the electric motor 40 and is therefore arranged coaxially with respect to the rotational axis or longitudinal axis A of the electric motor 40. The larger gearwheel 12 of the first stage 10 is arranged coaxially with respect to the rotational axis B which extends parallel to the rotational axis A of the electric motor 40.

The sun gear 21 of the planetary transmission 20, forming the second stage, is arranged coaxially with respect to the rotational axis B and is coupled in a rotationally fixed fashion to the larger gearwheel 12 of the first stage 10, so that the gearwheels 12 and 21 form a double gearwheel 12/21 which rotates about the rotational axis B.

The spur-gear transmission of the third stage 30 is formed by the gearwheels 31 and 32, wherein the smaller gearwheel 31 of the third stage 30 is arranged coaxially with respect to the rotational axis B and is coupled in a rotationally fixed fashion to the output of the planetary transmission 20. The larger gearwheel 32 of the third stage 30 is arranged coaxially with respect to the rotational axis C which extends parallel to the rotational axis A of the electric motor 40 and respectively parallel to the rotational axis B of the double gearwheel 12/21. The drive element 50 of the vehicle brake is usually also arranged coaxially with respect to the rotational axis C of the larger gearwheel 32 of the third stage 30.

The transmission unit of the actuating device 130 has an intermediate stage 24 which is embodied as a spur-gear transmission and is integrated into the third stage 30 of the transmission unit. The design of the further stage 24 of the transmission unit is apparent from FIG. 7, which shows a schematic plan view of the actuating device 130 according to FIG. 6.

The spur-gear transmission of the further stage 24 is formed by a first intermediate gearwheel 24a, which is arranged coaxially with respect to a rotational axis D, and a second intermediate gearwheel 24b, which is arranged coaxially with respect to a rotational axis E. The rotational axes D and E of the intermediate gearwheels 24a and 24b extend parallel to the rotational axis A of the electric motor 40 and respectively parallel to the rotational axis B of the double gearwheel 12/21 and parallel to the rotational axis C of the larger gearwheel 32 of the third stage 30. The two intermediate gearwheels 24a and 24b interact with the smaller gearwheel 31 of the third stage 30 and the larger gearwheel 32 of the third stage 30.

The two intermediate gearwheels 24a and 24b are dimensioned identically in terms of the number of their teeth and their diameter. This results in a symmetrical arrangement in which the rotational axis A of the electric motor 40, the rotational axis B of the double gearwheel 12/21 and the rotational axis C of the larger gearwheel 32 form a common plane A-B-C which extends perpendicularly with respect to the plane D-E formed by the rotational axes D and E of the intermediate gearwheels 24a and 24b.

Furthermore, the two intermediate gearwheels 24a and 24b are dimensioned in terms of the number of their teeth or their diameter in such a way that each intermediate gearwheel is larger than the smaller gearwheel 31 of the third stage 30 and smaller than the larger gearwheel 32 of the third stage 30.

The distance between the rotational axes B and C can be varied by means of the diameter of the intermediate gearwheels 24a and 24b and the distance of their rotational axes D and E from the plane A-B-C formed by the rotational axes A, B and C, in order to adapt the actuating device 130 to a predefined installation space in the vehicle.

Figure 7:
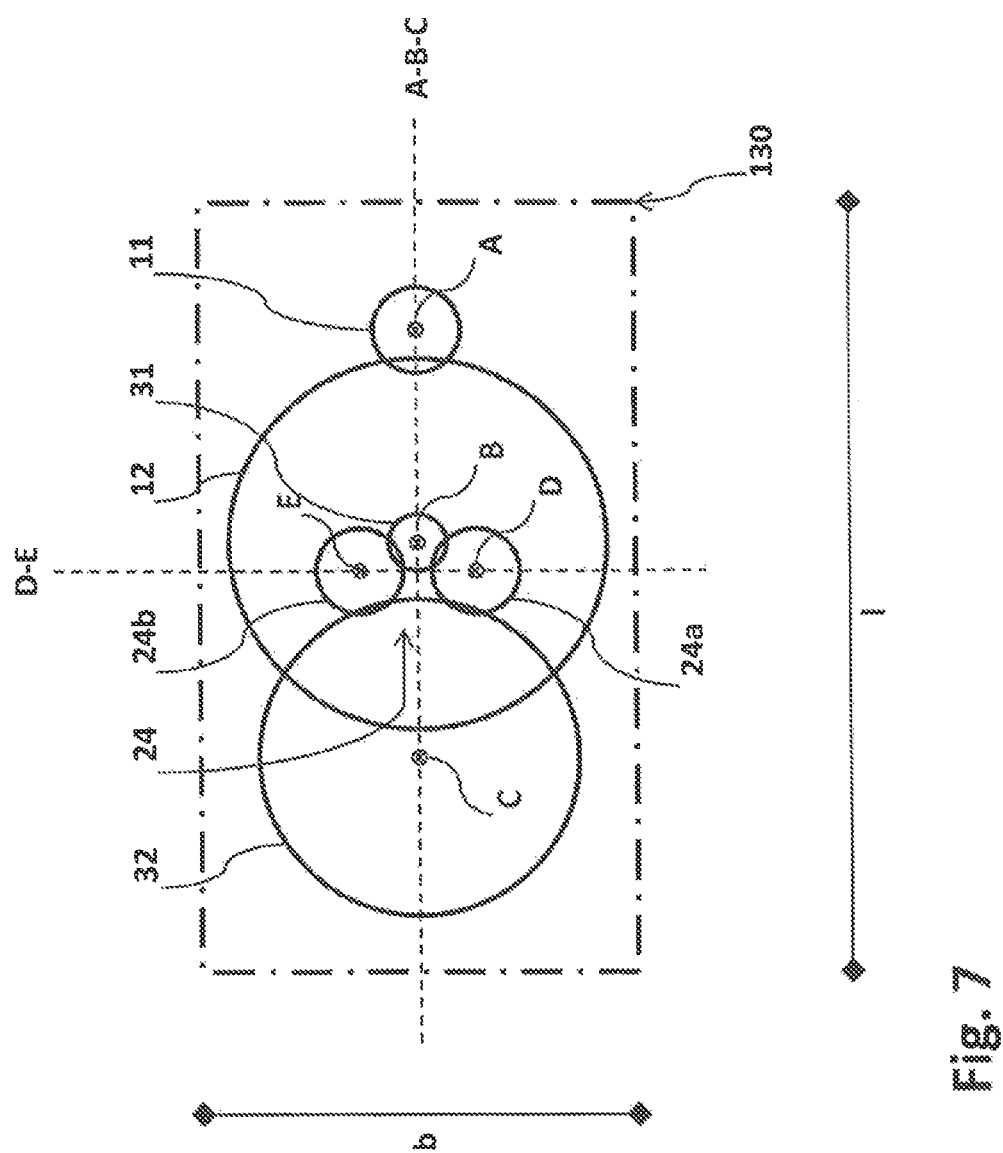
FIG. 7 is a schematic plan view of the actuating device according to FIG. 6.

As is shown in FIG. 6 and FIG. 7, the installation space required or the structural volume of the actuating device 130 according to the invention is obtained from its installation length l, installation height h and installation width b.

The installation length l is determined essentially by the distance between the rotational axis C of the larger gearwheel 32 and the rotational axis A of the electric motor 40. Since the sectional line at which the plane D-E formed by the rotational axes D and E of the intermediate gearwheels 24a and 24b intersects the plane A-B-C formed by the rotational axes A, B and C runs between the rotational axis A of the electric motor 40 and the rotational axis C of the larger gearwheel 32—precisely between the rotational axis B of the double gearwheel 12/21 and the rotational axis C of the larger gearwheel 32—and the diameter of the intermediate gearwheels 24a and 24b is correspondingly small, the actuating device 130 according to the invention does not require a significantly larger installation length l.

The installation height h is determined essentially by the dimensions of the first stage 10 and third stage 30, respectively arranged in a planar fashion, of the transmission unit. Since the intermediate stage 24, formed by the intermediate gearwheels 24a and 24b, is integrated into the third stage 30 and is spatially arranged in the plane thereof, the actuating device 130 according to the invention does not require a significantly larger installation height h.

The installation width b is determined essentially by the diameter of the larger gearwheel 12 of the first stage 10 and respectively the diameter of the larger gearwheel 32 of the third stage 30. Since the distance between the rotational axes D and E of the intermediate gearwheels 24a and 24b, respectively, and the plane A-B-C formed by the rotational axes A, B and C and the diameter of the intermediate gearwheels 24a and 24b are correspondingly small, so that the intermediate gearwheels 24a and 24b lie within the diameter of the larger gearwheel 12 or the diameter of the larger gearwheel 32, the actuating device 130 according to the invention does not require a significantly larger installation width b.

There will be no more detailed explanation of a fifth exemplary embodiment of an actuating device according to the invention in which the second stage is embodied as a planetary transmission 20 and in which a further transmission stage is not integrated into the third stage 30 but rather into the first stage 10 of the transmission unit. This is because this is immediately apparent to a person skilled in the art from the inventive actuating device 110 of the second exemplary embodiment according to FIG. 4 and FIG. 5, in which the intermediate stage 26 is embodied as a spur-gear transmission and is integrated into the first stage 10.

Likewise, there is no more detailed explanation of a sixth exemplary embodiment of an actuating device according to the invention in which the second stage is embodied as a planetary transmission 20 and in which a further transmission stage is integrated both into the first stage 10 and into the third stage 30 of the transmission unit. This is because this is apparent to a person skilled in the art by combining the inventive actuating device 130 of the fourth exemplary embodiment according to FIG. 6 and FIG. 7 and the inventive actuating device 110 of the second exemplary embodiment according to FIG. 4 and FIG. 5.

FIG. 8 is a schematic side view of a seventh exemplary embodiment of an actuating device 160 according to the invention for an electromechanically actuatable vehicle brake. In contrast with the inventive actuating devices 100, 110 and 130 shown in FIG. 2 to FIG. 7, in the transmission unit of the actuating device 160 the second stage 20 and the third stage 30 are each embodied as a spur-gear transmission; the first stage 10 is embodied as a planetary transmission (not illustrated in more detail).

In this context, the sun gear of the planetary transmission 10 which forms the first stage is formed by the drive pinion of the electric motor 40 and is therefore arranged coaxially with respect to the rotational axis or longitudinal axis A of the electric motor 40.

The spur-gear transmission of the second stage 20 is formed by the gearwheels 21 and 22*, wherein the smaller gearwheel 21 of the second stage 20 is arranged coaxially with respect to the rotational axis A and is coupled in a rotationally fixed fashion to the output of the planetary transmission 10. The larger gearwheel 22* of the second stage 20 is arranged coaxially with respect to the rotational axis B which extends parallel to the rotational axis A of the electric motor 40.

The spur-gear transmission of the third stage 30 is formed by the gearwheels 31* and 32, wherein the smaller gearwheel 31* of the third stage 30 is arranged coaxially with respect to the rotational axis and is coupled in a rotationally fixed fashion to the larger gearwheel 22* of the second stage 20, so that the gearwheels 22* and 31* form a double gearwheel 22*/31* which rotates about the rotational axis B. The larger gearwheel 32 of the third stage 30 is arranged coaxially with respect to the rotational axis C which extends parallel to the rotational axis A of the electric motor 40 and parallel to the rotational axis B of the double gearwheel 22/31.

As in the inventive actuating device 130 of the fourth exemplary embodiment according to FIG. 6 and FIG. 7, the transmission unit of the actuating device 160 has an intermediate stage 24 which is embodied as a spur-gear transmission and is integrated into the third stage 30 of the transmission unit.

There is no more detailed explanation of an eighth exemplary embodiment of an actuating device according to the invention in which the first stage is embodied as a planetary transmission 10 and in which a further transmission stage is not integrated into the third stage 30, but rather into the second stage 10 of the transmission unit. This is because to a person skilled in the art it is directly apparent from the inventive actuating device 100 of the first exemplary embodiment according to FIG. 2 and FIG. 3, in which the intermediate stage 25 is embodied as a spur-gear transmission and is integrated into the second stage 20.

There is also no more detailed explanation of a ninth exemplary embodiment of an actuating device according to the invention in which the first stage is embodied as a planetary transmission 10 and in which a further transmission stage is integrated both into the second stage 20 and into the third stage 30 of the transmission unit. This is because it is apparent to a person skilled in the art by combining the inventive actuating device 160 of the seventh exemplary embodiment according to FIG. 8 and the inventive actuating device 100 of the first exemplary embodiment according to FIG. 2 and FIG. 3.

A person skilled in the art knows that in practice the inventive actuating devices 100, 110, 130 and 160 comprise carrier elements, securing elements, centering elements and the like (not illustrated in more detail), for mounting and positioning the gearwheels 11, 12, 21, 22, 22*, 31, 31*, 32, 24a, 24b, 25a, 25b, 26a and 26b with respect to the rotational axes A, B, C, D, E, F and G. A person skilled in the art also knows that in practice all the components of the actuating device according to the invention are accommodated in a housing (not illustrated in more detail) so that the actuating devices 100, 110, 130 and 160 form an assembly which can be handled independently and which can be oriented as desired when it is attached to the vehicle brake (not illustrated in more detail). Suggestions in this respect can be found by a person skilled in the art in, inter alia, WO 2012/010256 A1 whose disclosure content is considered to be essential with respect to a practical structural configuration of the inventive actuating device 100, 110, 130 or 160, and is incorporated herein.

In conclusion, a practical numerical example for the configuration of the transmission unit will also be given for the inventive actuating devices 100 and 110 which are shown in FIG. 2 to FIG. 5. If the smaller gearwheel 11 has 15 teeth and the larger gearwheel 12 has 75 teeth, the reduction ratio of the first stage 10 is 5:1. If the smaller gearwheel 21 has 10 teeth and the larger gearwheel 22 has 60 teeth, the reduction ratio of the second stage 20 is 6:1. If the planetary transmission of the third stage 30 has a reduction ratio of 13:1, the total reduction ratio of the transmission unit is then 390:1.

The intermediate gearwheels 24a, 24b and 25a, 25b and 26a, 26b of the intermediate stage 24 or 25 or 26 do not act directly on the total reduction ratio of the transmission unit but instead serve, as mentioned above, to conduct away the increased reaction forces which result from the change in the transmission ratios or reduction ratios of the stages 10, 20 and 30 which are present in the transmission unit. Owing to the intermediate gearwheels 26a and 26b, in the case of the first stage 10 the smaller gearwheel 11 is not in engagement with the larger gearwheel 12; and in the case of the second stage 20 the smaller gearwheel 21 is not in engagement with the larger gearwheel 22 owing to the intermediate gearwheels 25a and 25b; and in the third stage 30 the smaller gearwheel 31 is not in engagement with the larger gearwheel 32 owing to the intermediate gearwheels 24a and 24b. The intermediate gearwheels 24a, 24b and 25a, 25b and 26a, 26b can have, for example, 20 teeth each, in order to be able to be integrated in a space-saving fashion into the first stage 10 or second stage 20 or third stage 30 which is present.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An actuating device for an electromechanically actuatable vehicle brake, comprising
a multi-stage transmission unit, which is arranged between a driving electric motor and a driven drive element of the vehicle brake, wherein
at least one stage of the transmission unit is embodied as a spur-gear transmission, and at least two stages of the transmission unit are coupled by means of a double gearwheel, a rotational axis of the double gearwheel extends parallel to a rotational axis of the electric motor, and wherein
the transmission unit has at least one intermediate stage which is embodied as a spur-gear transmission and into which at least one stage, embodied as a spur-gear transmission, of the transmission unit is integrated, wherein
the intermediate stage which is embodied as a spur-gear transmission has two intermediate gearwheels; wherein
rotational axes of the intermediate gearwheels extend parallel to the rotational axis of the electric motor; and
wherein a plane formed by the rotational axes of the intermediate gearwheels extends perpendicularly with respect to the plane formed by the rotational axis of the electric motor and the rotational axis of the double gearwheel.

2. The actuating device as claimed in claim 1, wherein the two intermediate gearwheels are dimensioned identically.

3. The actuating device as claimed in claim 1, wherein the first and the second stages of the transmission unit are each embodied as spur-gear transmissions, wherein the at least one intermediate stage is integrated into the first and/or the second stage of the transmission unit.

4. The actuating device as claimed in claim 3, wherein the first and second stages of the transmission unit are coupled by means of the double gearwheel, the rotational axis of the double gearwheel extends parallel to the rotational axis of the electric motor.

5. The actuating device as claimed in claim 4 wherein a sectional line at which the plane formed by the rotational axes of the intermediate gearwheels intersects the plane formed by the rotational axes of the electric motor and both of the double gearwheels runs between the rotational axis of the electric motor and the rotational axis of the another double gearwheel which couples the second and third stages.

6. The actuating device as claimed in claim 3, wherein the second stage is coupled to a third stage by means of another double gearwheel, the rotational axis of the another double gearwheel extends parallel to the rotational axis of the electric motor.

7. The actuating device as claimed in claim 6, wherein the third stage is embodied as a planetary transmission.

8. The actuating device as claimed in claim 6, wherein the second and third stages of the transmission unit are each embodied as a spur-gear transmission, wherein the at least one intermediate stage is integrated into the second and/or third stages of the transmission unit.

9. The actuating device as claimed in claim 8, wherein the second stage is coupled to the third stage by means of a double gearwheel, and the first stage is embodied as a planetary transmission.

10. The actuating device as claimed in claim 6, wherein a drive element of the vehicle brake is driven on an output side by the third stage of the transmission unit.

11. The actuating device as claimed in claim 6, wherein the second stage of the transmission unit is connected downstream of the first stage of the transmission unit and/or connected upstream of the third stage of the transmission unit.

12. The actuating device as claimed in claim 1, wherein the first and a third stage of the transmission unit are each embodied as a spur-gear transmission, wherein the at least one intermediate stage is integrated into the first and/or third stage of the transmission unit.

13. The actuating device as claimed in claim 12, wherein the first stage is coupled to the second stage by means of a double gearwheel, and the second stage is embodied as a planetary transmission.

14. The actuating device as claimed in claim 12, wherein the rotational axis of a gearwheel which has the largest diameter in the third stage lies in the plane formed by the rotational axis of the electric motor and the rotational axis of the double gearwheel.

15. The actuating device as claimed in claim 12, wherein a sectional line at which the plane formed by the rotational axes of the intermediate gearwheels intersects the plane formed by the rotational axes of the electric motor and of the double gearwheel runs between the rotational axis of the electric motor and the rotational axis of a gearwheel which has the largest diameter in the third stage.

16. The actuating device as claimed in claim 1, wherein the first stage of the transmission unit is driven on the input side by the electric motor.

17. The actuating device as claimed in claim 1, wherein at least one stage of the transmission unit into which no intermediate stage is integrated is embodied as a belt drive or friction gear.

18. An electromechanically actuatable vehicle brake, comprising
an actuating device as claimed in claim 1, and
a drive element which converts the rotational movement generated on an output side by the transmission unit of the actuating device into a longitudinal movement in order to actuate the vehicle brake.

19. An actuating device for an electromechanically actuatable vehicle brake, comprising
a multi-stage transmission unit, which is arranged between a driving electric motor and a driven drive element of the vehicle brake, wherein
at least one stage of the transmission unit is embodied as a spur-gear transmission, and at least two stages of the transmission unit are coupled by means of a double gearwheel, a rotational axis of the double gearwheel extends parallel to a rotational axis of the electric motor, and wherein
the transmission unit has at least one intermediate stage which is embodied as a spur-gear transmission and into which at least one stage, embodied as a spur-gear transmission, of the transmission unit is integrated, wherein
the intermediate stage which is embodied as a spur-gear transmission has two intermediate gearwheels; wherein
the first and the second stages of the transmission unit are each embodied as spur-gear transmissions, wherein
the at least one intermediate stage is integrated into the first and/or the second stage of the transmission unit; wherein
the second stage is coupled to a third stage by means of another double gearwheel, the rotational axis of the another double gearwheel extends parallel to the rotational axis of the electric motor, and wherein
the rotational axis of the double gearwheel which couples the second and third stages lies in the plane formed by the rotational axis of the electric motor and the rotational axis of the double gearwheel which couples the first and second stages.

\* \* \* \* \*